Patented Feb. 8, 1927.

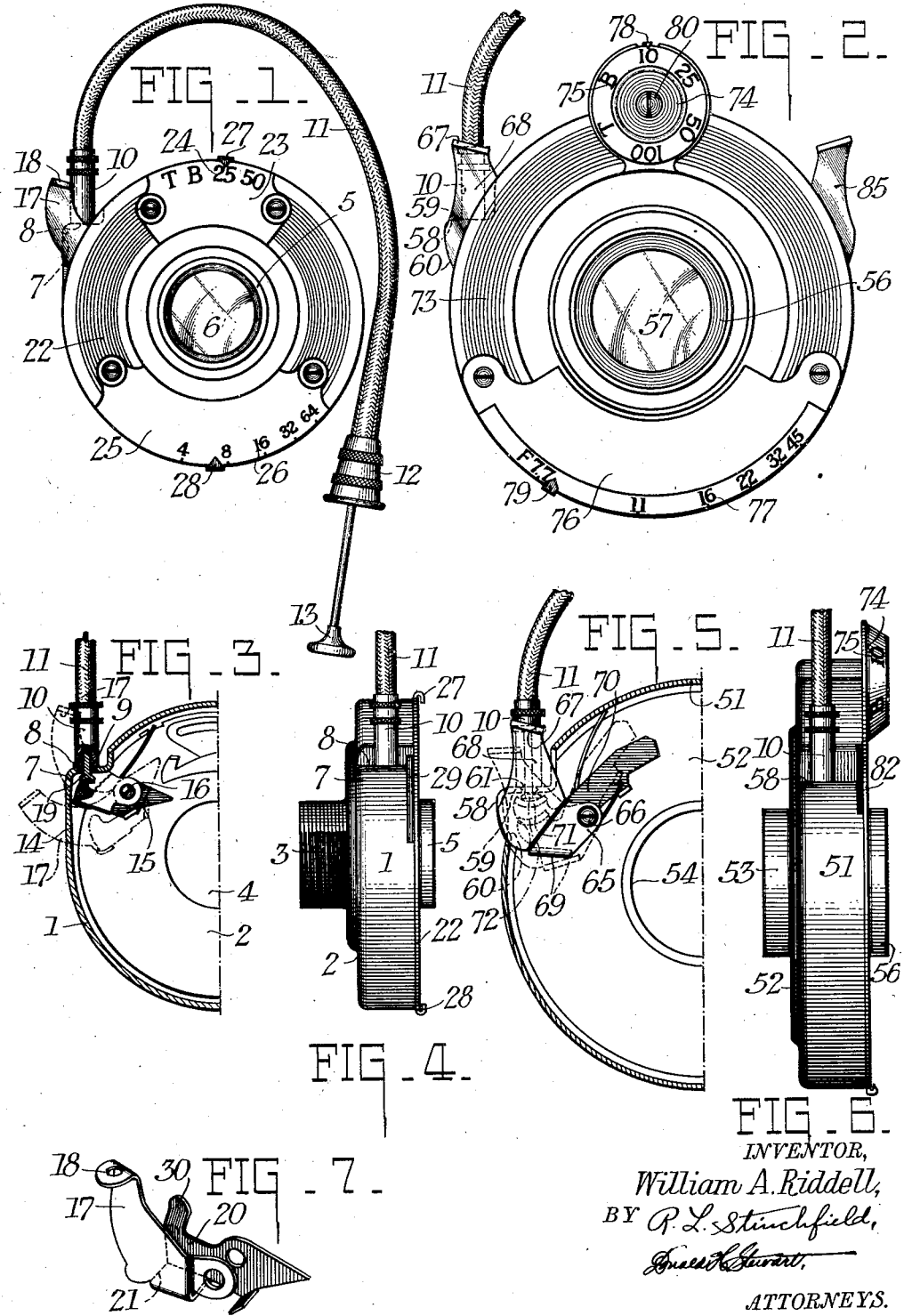

1,616,925

UNITED STATES PATENT OFFICE.

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC SHUTTER CASING.

Application filed May 19, 1924. Serial No. 714,308.

This invention relates to photography, and more particularly to photographic shutter casings. One object of my invention is to provide a shutter casing having a cable release support which will hold the release in a position from which it may be folded without sharp bends into a compact camera; another object is to provide a flat shoulder for the cable release support in the shutter casing wall; another object is to provide such a cable release support in the casing and still retain the conventional circular cover plate, providing parts supplementary to the cover plate for covering the offset cable release support; and other objects will appear hereinafter from the specification, the novel features being pointed out in the claims at the end thereof.

In the drawings, wherein like reference characters denote like parts throughout:

Fig. 1, is a plan view of shutter constructed in accordance with and illustrating one embodiment of my invention;

Fig. 2, is a similar view of another embodiment of my invention;

Fig. 3, is a section through parts of the shutter shown in Fig. 1;

Fig. 4, is a side elevation of the shutter shown in Fig. 1;

Fig. 5, is a section through parts of the shutter shown in Fig. 2;

Fig. 6, is a side elevation of the shutter shown in Fig. 2; and

Fig. 7, is a detail perspective of the shutter releasing lever used in the first illustrated embodiment of my invention.

In Figs. 1, 3, 4 and 7 I have shown my invention as incorporated in an automatic shutter which I designed, being shown in my U. S. Patent No. 1,481,271 issued June 22, 1924, and in my application for patent Serial No. 612,218 filed Jan. 2, 1923.

The shutter casing consists of an annular wall 1 extending upwardly from a base or bottom 2, from which a rear tube 3 may extend, leaving the central opening 4 in which the lens cells 5 may be inserted. The objective may be of any preferred type and is here shown as a "double" lens, the front element 6 being shown in Fig. 1.

In accordance with this invention the annular wall is interrupted by a jog at 7, which includes an upper flat wall 8, which is threaded at 9 to receive a ferrule 10 of a cable release 11. This may be of any standard type including the grip 12 and actuating plunger 13. Wall 8 is positioned crosswise of the annular wall 1 so that the release will be attached substantially tangentially to the shutter casing, thus permitting the release to fold compactly in small cameras without sharp bends. Being flat, wall 8 also forms a plane surface against which ferrule 10 can be securely seated.

A wall 14 extends downwardly from wall 8 thus leaving sufficient clearance for the shutter release trigger 15 to move about its pivot 16. This trigger may be released by a finger release, in which case arm 17 can be depressed through button 18; or it may be actuated by the cable release terminal 19, in which case arm 20 is moved when the cable release plunger is actuated through plunger 13, causing terminal 19 to press down on arm tip 30. As shown in Fig. 7, arms 17 and 20 are joined by a wall 21 to move together.

In order to retain a symmetrical outline, the shutter cover plate 22 is made circular in form and is preferably provided with a shutter leaf regulating plate 23 bearing the scale 24, and a shutter diaphragm regulating plate 25 with a scale 26. Pointers 27 and 28 may move over these scales in the usual manner. Shutter plate 22 would normally leave the offset portion 7 uncovered, rendering the shutter unsightly and open for dirt to enter. The shutter release 17 is positioned so as to normally cover this extension beyond the cover plate, and, as shown in Fig. 1, almost completely obscures the offset when the shutter is viewed from the front. As shown in Fig. 4 the ferrule 10 is located behind a slot 29 through which the release 17 functions so that, as the finger button 18 extends forwardly (Fig. 7) the release can be easily operated. As the threaded socket 9 points directly upward it greatly facilitates attaching cable release 11.

In Figs. 2, 5 and 6 I have shown a second embodiment of my invention in which a shutter of the setting type is shown. Here the casing consists of an annular wall 51 extending upwardly from a base or bottom 52 in which there is a central opening 54 for receiving the rear lens cell 53, the front cell 56 holding the front objective portion 57. In this casing the annular wall 51 is interrupted with a formed out portion 58, having an upper flat wall 59 and a curved side wall 60. Wall 59 is threaded at 61 to receive ferrule 10 of cable release 11, and, as in the first described embodiment of my invention the release is held substantially at a tangent to the shutter casing. The curved wall 60 leaves clearance for the release trigger 65, which is pivotally mounted on the casing at 66.

A finger button 67 is carried by arm 68, which forms a part of the trigger 65 being connected thereto by a plate 69. A second arm 70 lying behind (in Fig. 5) and spaced from arm 68 is provided with a flange 71 which is in the path of button 72 on the cable release 11. Arm 68 is shaped so as to cover all of the wall interruption not covered by the shutter cover plate 73 so that the circular plate may be used. This plate carries a shutter leaf regulating dial 74 bearing a scale 75, and a shutter diaphragm plate 76 carrying a scale 77. A pointer 79 is movable over scale 77, and a stationary pointer 78 is provided for scale 75 which is revoluble upon a stud 80. This shutter also carries a setting lever 85. Arm 68 operates through the slot 82 which is best shown in Fig. 6.

In both the above described embodiments of my invention the casing is provided with an offset from the annular wall to provide a clearance space for the shutter tripping lever, and also to provide a cable release seat which will hold the release in an upright position substantially tangent to the casing. In each case the shutter arms are of suitable size and shape to also form a cover for the offset, thus permitting an annular cover plate to be used, as this type is the most attractive looking. The cable release is screwed down against a plane surface, and the few threads usually provided on such releases, are sufficient to form a firm connection with the casing.

Having thus described my invention, what I claim is new and desire to obtain by Letters Patent is:

1. A photographic shutter casing having an annular peripheral wall of sheet material, a section of said wall being bent from the annular portion to form a relatively short flat area disposed cross-wise of the annular wall and adapted to support a cable release, and means in the flat portion of the wall for receiving a cable release whereby the release may be supported by the shutter casing.

2. A photographic shutter casing having an annular peripheral wall adapted to enclose the shutter mechanism, a shutter release trigger included in the mechanism, and a jog in the shutter casing annular wall located adjacent the release trigger and deforming the annular wall, a portion of the deformed wall providing clearance for the release trigger, and another portion of the deformed wall providing a plane surface adapted to support a cable release in position to cooperate with the release trigger.

3. A photographic shutter having a casing consisting of a base having an annular flange forming a wall of the shutter and an anular shutter cover plate adapted to enclose the shutter mechanism, an exposure trigger included in the mechanism, a deformation in the annular wall having two angularly arranged walls, one being adapted to provide a clearance for the exposure trigger and the other having a cable release engaging portion adapted to cooperate with a cable release to position the release for actuating the exposure trigger.

4. In combination, a photographic shutter and a casing for the shutter including an annular wall, a jog in the annular wall having a flat wall positioned cross-wise of the annular wall, an annular shutter cover plate adapted to lie over the annular wall, a shutter release lever carried by the shutter and having a flat arm adapted to cover a portion of the jog extending beyond the annular shutter cover plate.

5. In combination, a photographic shutter, and a casing for the shutter including an annular wall, a jog in the wall providing a short flat wall arranged cross-wise of the annular wall, an annular shutter cover adapted to cover the annular flange, and a shutter release lever of a size and shape to cover the jog in the annular wall, whereby the shutter as a whole appears symmetrical in form.

6. In combination, a photographic shutter, and a casing therefor including an annular flange forming a wall of the casing, a jog in the annular wall, a shutter cover plate for covering the casing, a portion of the jog extending beyond the periphery of the shutter cover plate, and an exposure lever carried by the shutter and located adjacent the jog, a portion of the exposure lever lying over the top of the jog which extends beyond the shutter cover forming a cover therefor.

7. In combination, a photographic shutter and a casing for the shutter including an annular wall, a jog in the wall extending beyond the periphery of the annular wall providing an offset portion in the casing, a shutter release trigger mounted in the shutter and a part of which is adapted to move in the offset portion of the casing, and a lever arm forming a part of the trigger extending over the offset portion of the casing, being normally adapted to obscure the offset.

8. In combination, a photographic shutter and a casing for the shutter including an annular wall, a jog in the wall extending beyond the periphery of the annular wall, a cable release attaching means carried by a wall of the jog, a shutter release trigger mounted in the shutter and having an operating arm adapted to move beneath the wall of the jog in a position in which a cable release carried by the attaching means may be used to cooperate with the operating arm to trip the shutter trigger.

Signed at Rochester, New York this 12th day of May 1924.

WILLIAM A. RIDDELL.